(12) United States Patent
Huang

(10) Patent No.: US 9,027,234 B2
(45) Date of Patent: May 12, 2015

(54) MOTOR STATOR AUTOMATICALLY ASSEMBLING SYSTEM

(71) Applicant: Jung-Pei Huang, Kaohsiung (TW)

(72) Inventor: Jung-Pei Huang, Kaohsiung (TW)

( * ) Notice: Subject to any disclaimer, the term of this patent is extended or adjusted under 35 U.S.C. 154(b) by 176 days.

(21) Appl. No.: 13/896,618

(22) Filed: May 17, 2013

(65) Prior Publication Data

US 2014/0338188 A1    Nov. 20, 2014

(51) Int. Cl.

| | |
|---|---|
| B23P 19/00 | (2006.01) |
| H02K 15/00 | (2006.01) |
| H02K 1/00 | (2006.01) |
| H02K 3/00 | (2006.01) |
| H02K 17/00 | (2006.01) |
| H02K 19/00 | (2006.01) |
| H02K 15/095 | (2006.01) |

(52) U.S. Cl.
CPC .................................. H02K 15/095 (2013.01)

(58) Field of Classification Search
CPC ... H02K 15/068; H02K 15/16; H02K 15/024; H02K 3/28
USPC ..................................... 29/732, 596; 310/198
See application file for complete search history.

(56) References Cited

U.S. PATENT DOCUMENTS

| | | | | |
|---|---|---|---|---|
| 4,246,694 A | * | 1/1981 | Raschbichler et al. | 29/596 |
| 4,310,966 A | * | 1/1982 | Breitenbach | 29/596 |
| 4,825,531 A | * | 5/1989 | Nold | 29/596 |
| 5,636,432 A | * | 6/1997 | Usher et al. | 29/596 |
| 7,078,843 B2 | * | 7/2006 | Du et al. | 310/216.091 |
| 7,146,706 B2 | * | 12/2006 | Du et al. | 29/596 |
| 7,205,696 B2 | * | 4/2007 | Du et al. | 310/216.091 |
| 2002/0079780 A1 | * | 6/2002 | Muszynski | 310/218 |
| 2006/0192457 A1 | * | 8/2006 | Nakayama et al. | 310/211 |
| 2008/0258668 A1 | * | 10/2008 | Oguri et al. | 318/538 |
| 2010/0141059 A1 | * | 6/2010 | Nishimura | 310/44 |
| 2012/0119606 A1 | * | 5/2012 | Chen et al. | 310/198 |
| 2014/0182117 A1 | * | 7/2014 | Chang et al. | 29/596 |
| 2014/0338182 A1 | * | 11/2014 | Huang | 29/596 |
| 2014/0338188 A1 | * | 11/2014 | Huang | 29/732 |

* cited by examiner

*Primary Examiner* — David Angwin

(74) *Attorney, Agent, or Firm* — Alan D. Kamrath; Kamrath IP Lawfirm, P.A.

(57) ABSTRACT

A motor stator automatically assembling system includes a feeding unit, a wire-winding unit, a first conveyer unit, a second conveyer unit, a first assembly unit and a second assembly unit. A motor stator automatically assembling method includes: the feeding unit is operated to feed a plurality of insulation members; the insulation members are arranged on the first conveyer unit to convey to the wire-winding unit; the wire-winding unit is operated to wind wires on the insulation members to form a plurality of wire-wound insulation members; the wire-wound insulation members are arranged on the second conveyer unit to convey to the first assembly unit; the first assembly unit is operated to insert pole teeth into the wire-wound insulation members to form a plurality of compact pole tooth sets; the second assembly unit is operated to combine the compact pole tooth sets with a stator ring frame to form an assembled motor stator.

16 Claims, 6 Drawing Sheets

MOTOR STATOR AUTOMATICALLY ASSEMBLING SYSTEM

BACKGROUND OF THE INVENTION

1. Field of the Invention

The present invention relates to a motor stator automatically assembling system, assembly line and assembling method thereof. More particularly, the present invention relates to the motor stator automatically and continuously assembling system, assembly line and assembling method thereof.

2. Description of the Related Art

Taiwanese Patent Application Publication No. 201220649, entitled "Motor stator and assembling method thereof," discloses a motor stator including a stator unit and an auxiliary inductive unit. The stator unit includes a PCB substrate and a plurality of inductive coils which are equi-spaced apart and embedded in the PCB substrate. The auxiliary inductive unit includes an insulation member, a magnetically conductive member and at least one winding set. The insulation member is arranged on the PCB substrate and the magnetically-conductive member is arranged on the insulation member. The winding is combined with the magnetically conductive member, the insulation member and the PCB substrate. The winding includes a pillar member and an auxiliary coil wound thereon. The pillar member extends through the magnetically conductive member, the insulation member and the PCB substrate. The pillar member with the coil wound protrudes into the PCB substrate so as to increase the number of total turns of each coil or the total number of poles deployed on the stator unit, thereby improving the magnetically driving force of the motor stator.

However, the assembling method of the motor stator applied in TWN Patent Appl. Pub. No. 201220649 is not an automatically assembling method. Hence, there exists a need of providing an automatically assembling method for the conventional motor stator. The above-mentioned patent is incorporated herein by reference for purposes including, but not limited to, indicating the background of the present invention and illustrating the state of the art.

As is described in greater detail below, the present invention provides a motor stator automatically assembling system and method thereof. A plurality of automatic assembly units and a plurality of conveyer units are provided in an assembly line to automatically assemble and convey motor stator components to form an assembled motor stator in such a way as to mitigate and overcome the above problem.

SUMMARY OF THE INVENTION

The primary objective of this invention is to provide a motor stator automatically assembling system and method thereof. A plurality of automatic assembly units and a plurality of conveyer units are connected to form an automatically assembly line along which to automatically assemble motor stator components step by step for forming a semi-assembled motor stator to a completely-assembled motor stator. Accordingly, the motor stator automatically assembling system and method of the present invention is successful in providing an automatically manufacturing process of the motor stator.

The motor stator automatically assembling method in accordance with an aspect of the present invention includes the steps of:

selecting and feeding insulation members by a feeder unit and a vibrator unit;

supplying and arranging the insulation members on a first conveyer unit which conveys the insulation members to a wire-winding unit;

winding at least one wire on the associated insulation member to form wire-wound insulation members by the wire-winding unit;

supplying and arranging the wire-wound insulation members on a second conveyer unit which conveys the wire-wound insulation members to a first assembly unit;

inserting pole teeth into the wire-wound insulation members to form a plurality of compact pole tooth sets by the first assembly unit; and inserting the compact pole tooth sets into a predetermined stator ring frame to form a semi-assembled motor stator by a second assembly unit.

In a separate aspect of the present invention, the motor stator automatically assembling method further includes the step of: prior to selecting and feeding the insulation members, inserting at least one pin in the insulation member by a pin insert unit.

In a further separate aspect of the present invention, the motor stator automatically assembling method further includes the step of: while winding wires on the insulation members, further winding the wires on the associated pin to electrically connect therewith.

In yet a further separate aspect of the present invention, the motor stator automatically assembling method further includes the steps of: moistening the pins of the wire-wound insulation members with solder paste, soldering the pins with the wires, bending the pins to form a bent portion, executing an impedance or insulation test on the wire-wound insulation members by a first test equipment and combination thereof.

In yet a further separate aspect of the present invention, the pole teeth are provided in a feed magazine from which to insert the stacked pole teeth into the wire-wound insulation members.

In yet a further separate aspect of the present invention, the motor stator automatically assembling method further includes the steps of: supplying the stator ring frame to second assembly unit by a third conveyer unit.

In yet a further separate aspect of the present invention, the motor stator automatically assembling method further includes the steps of: rotating the stator ring frame with respect to the second assembly unit by a rotary unit, thereby inserting each of the pole tooth sets into the stator ring frame.

In yet a further separate aspect of the present invention, the motor stator automatically assembling method further includes the steps of: inserting the pins of the semi-assembled motor stator in a printed circuit board, thereby combining the semi-assembled motor stator with the printed circuit board to form a complete-assembled motor stator, and further bending the pins, moistening the pins with solder paste and soldering the pins with the printed circuit board.

In yet a further separate aspect of the present invention, the motor stator automatically assembling method further includes the steps of: punching at least one surface of the semi-assembled motor stator to form at least one recession which is formed to combine the pole teeth each other or to combine the pole tooth sets with the stator ring frame so as to reinforce the structure of the semi-assembled motor stator.

In yet a further separate aspect of the present invention, the motor stator automatically assembling method further includes the steps of: executing a power test, a resistance test, a dielectric withstand voltage test, an insulation shock test or a load test on the complete-assembled motor stator by a second test equipment.

The motor stator automatically assembling system in accordance with another aspect of the present invention includes:

a feeder unit provided to feed a plurality of insulation members;

a first conveyer unit connecting to the feeder unit to receive the insulation members therefrom, the first conveyer unit operated to arrange the insulation members thereon and to convey the insulation members from the feeder unit;

a wire-winding unit connecting to the first conveyer unit to receive the insulation members therefrom, the wire-winding unit operated to wind wires on the insulation members to form a plurality of wire-wound insulation members;

a second conveyer unit connecting to the wire-winding unit to receive the wire-wound insulation members therefrom, the second conveyer unit operated to arrange the wire-wound insulation members thereon and to convey the wire-wound insulation members from the wire-winding unit;

a first assembly unit connecting to the second conveyer unit to receive the wire-wound insulation members therefrom, the first assembly unit operated to insert pole teeth into the wire-wound insulation members to form a plurality of compact pole tooth sets; and a second assembly unit operated to insert the compact pole tooth sets into a predetermined stator ring frame to form a semi-assembled motor stator.

In a separate aspect of the present invention, the feeder unit further includes a vibrator unit which is operated to select the insulation members prior to feeding.

In a further separate aspect of the present invention, further including a pin insert unit which is operated to insert at least one pin in the insulation member.

In yet a further separate aspect of the present invention, further including a third conveyer unit connected between the first assembly unit and the second assembly unit, the third conveyer unit operated to convey the compact pole tooth sets to the second assembly unit.

In yet a further separate aspect of the present invention, further including a fourth conveyer unit which is operated to convey the stator ring frame to the second assembly unit.

In yet a further separate aspect of the present invention, further including a soldering unit which is operated to solder the pins to form a plurality of coil sets.

In yet a further separate aspect of the present invention, further including a first test equipment unit which is operated to execute an impedance or insulation test on the wire-wound insulation members.

In yet a further separate aspect of the present invention, further including a second test equipment unit which is operated to execute a power test, a resistance test, a dielectric withstand voltage test, an insulation shock test or a load test on the complete-assembled motor stator.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a motor stator automatically assembling system and method in accordance with the preferred embodiment of the present invention is suitable for assembling and testing various motor stator steps, for example: inner or outer stator assembling steps, which are not limitative of the present invention. The motor stator automatically assembling system and method in accordance with the preferred embodiment of the present invention is suitably implemented by utilizing various automatic apparatus, for example: auto pin insert machines, auto conveyers, auto wire-winding machines, auto punch machines, auto testing equipments and combination thereof, which are not limitative of the present invention.

Figure 1:
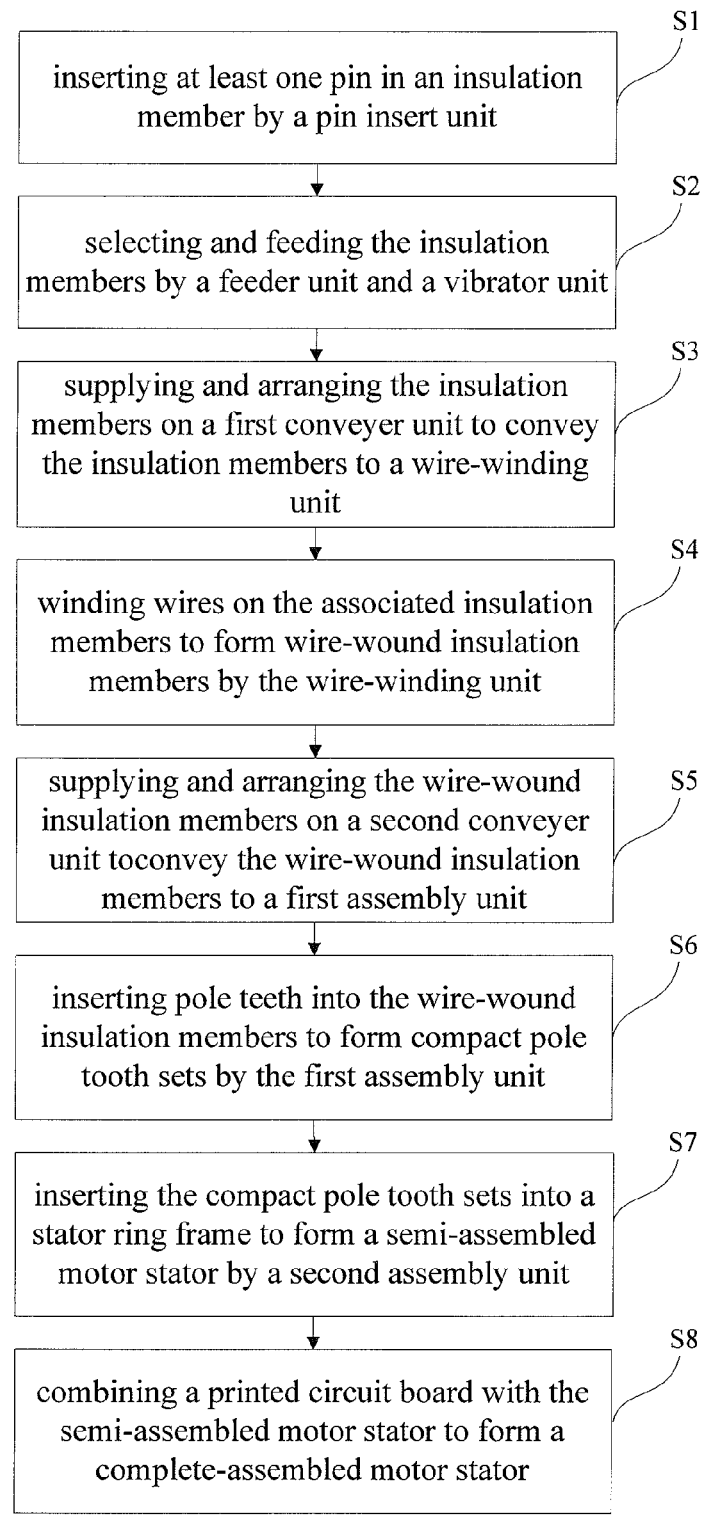
FIG. 1 is a flow chart of a motor stator automatically assembling method in accordance with a preferred embodiment of the present invention.
Figure 1A:
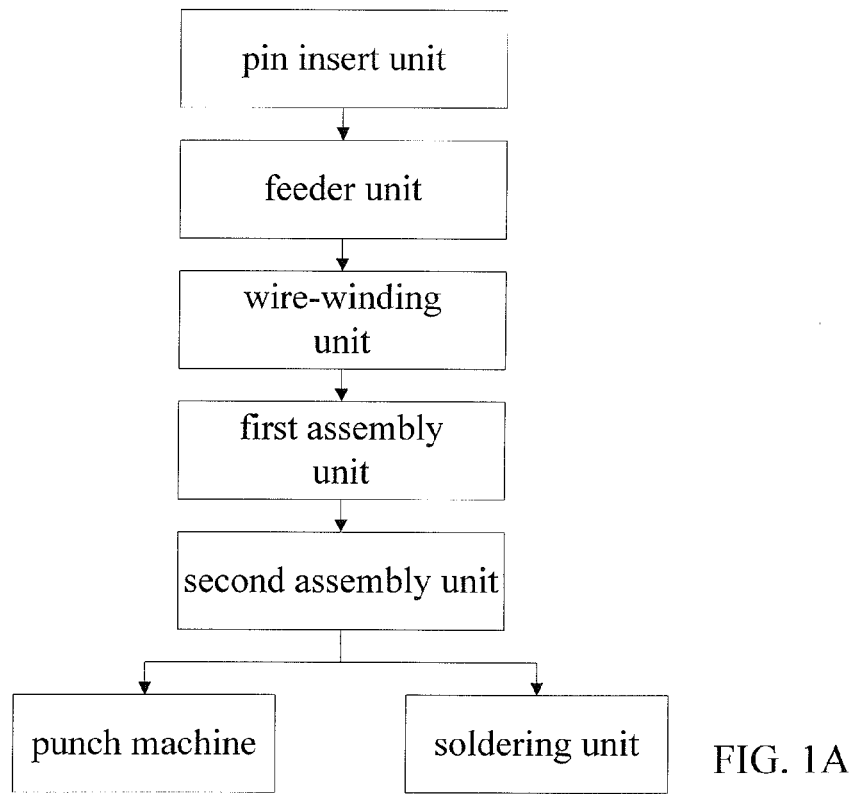
FIG. 1A is a block of a motor stator automatically assembly line in accordance with a preferred embodiment of the present invention.
Figure 2A:
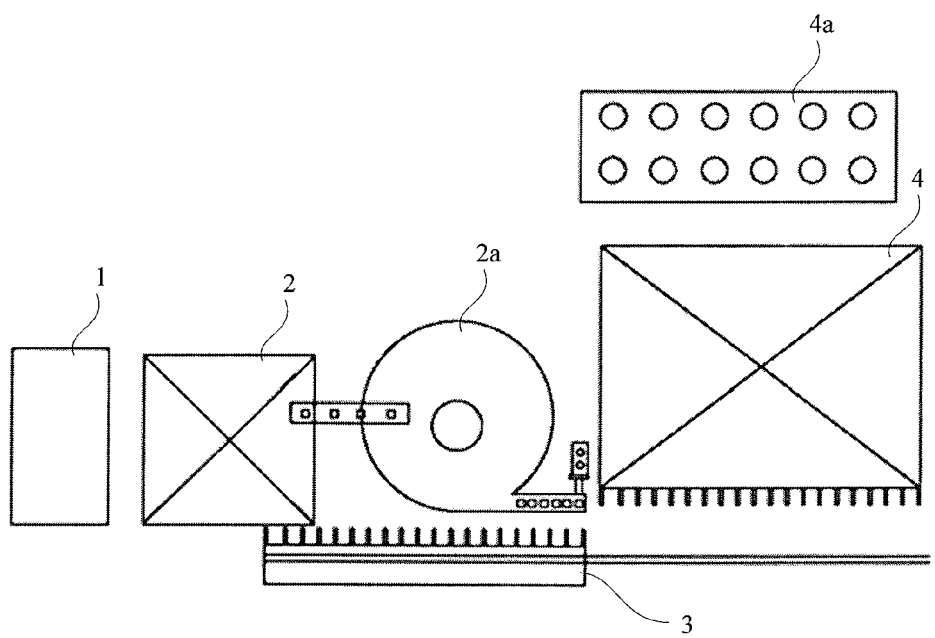
FIGS. 2A and 2B are fragmentally schematic views of first and second portions of a motor stator automatically assembling system in accordance with a preferred embodiment of the present invention.
Figure 2B:
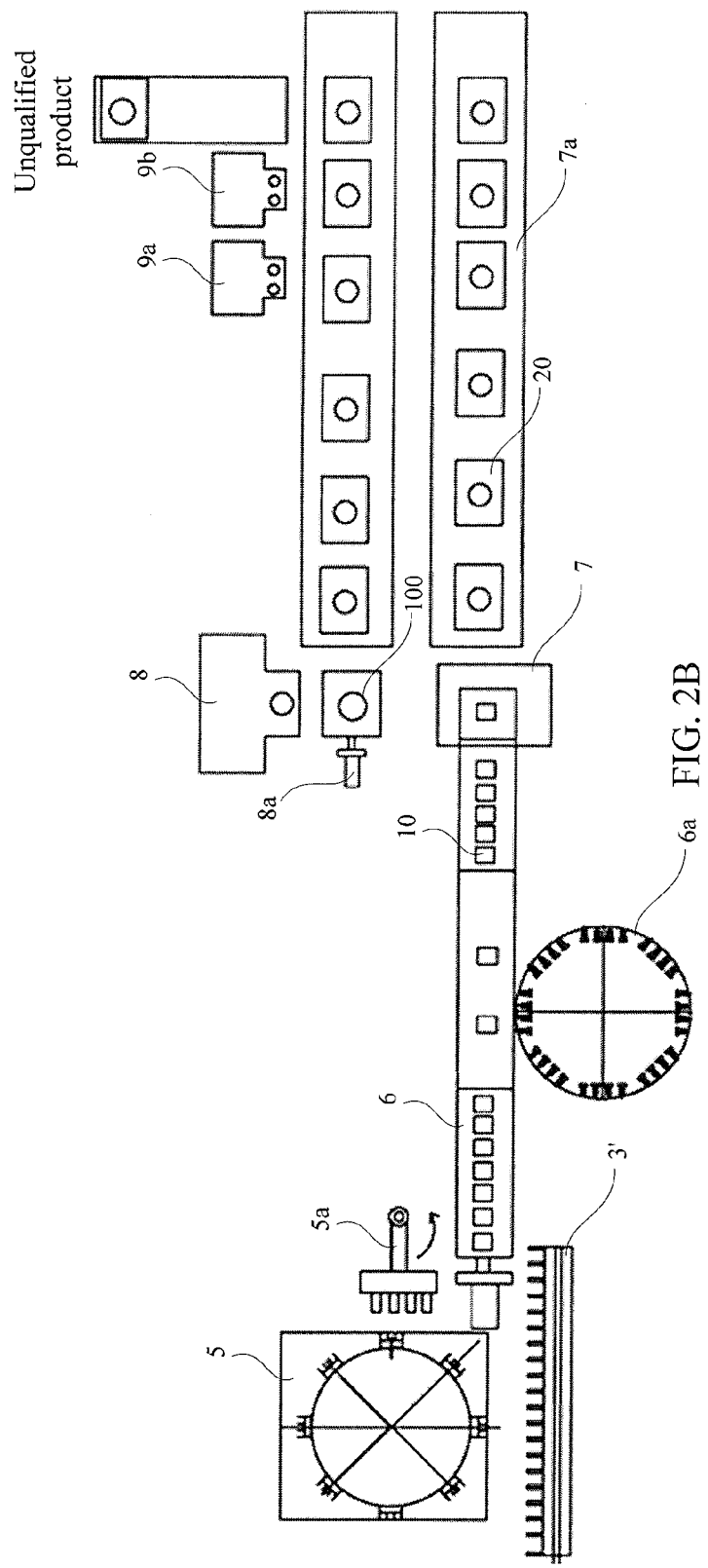
Figure 3:
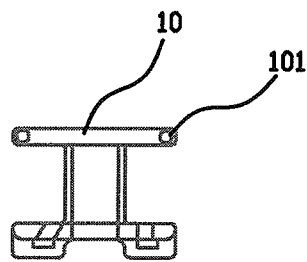
FIG. 3 is a schematic view of an insulation member applied in the present invention.

Referring to FIGS. 1, 1A, 2A and 2B, the motor stator automatically assembling method, as shown in FIG. 1, in accordance with a preferred embodiment of the present invention includes eight steps corresponding to the motor stator automatically assembling system, as best shown in FIGS. 2A and 2B, or the assembly line, as best shown in FIG. 1A. Turning now to FIG. 3, an isolation member or the like (e.g. isolation jacket or bobbin member) is applied to execute an automatically assembling method in accordance with the present invention.

Referring to FIGS. 1, 2A and 3, the motor stator automatically assembling method in accordance with the preferred embodiment of the present invention includes the step S1: automatically inserting at least one pin 101 in each predetermined side position of insulation members (e.g. isolation jacket) 10 by a pin insert unit (e.g. pin insert machine) 1, thereby automatically supplying the insulation members 10 therefrom. Each of the insulation members 10 has a central hole and a wire-winding recess formed therearound, as best shown in FIG. 3.

Still referring to FIGS. 1, 2A and 3, the motor stator automatically assembling method in accordance with the preferred embodiment of the present invention includes the step S2: automatically selecting and feeding the insulation members 10 by a feeder unit (e.g. feeder machine) 2 and a vibrator unit (e.g. vibrator machine) 2a connected therewith, thereby feeding the insulation members 10 into an assembly line and selecting the unqualified insulation members 10. The insulation members 10 received from the pin insert unit 1 are automatically conveyed by the feeder unit 2 to the vibrator unit 2a.

With continued reference to FIGS. 1, 2A and 3, the motor stator automatically assembling method in accordance with the preferred embodiment of the present invention includes the step S3: automatically supplying and arranging the insulation members 10 in order on a first conveyer unit (e.g. a pair of automatically reciprocated slides) 3 which is operated to automatically convey the insulation members 10 from the pin insert unit 1 or the vibrator unit 2a to an auto wire-winding unit (e.g. multi-winding machine) 4. By way of example, the insulation members 10 are automatically arranged in order on positioning seats of the first conveyer unit 3 and are further conveyed along a track to a predetermined position (e.g. the auto wire-winding unit 4) so as to process a procedure of wire-winding, soldering, testing and other processing.

Figure 4:
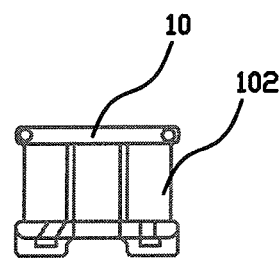
FIG. 4 is a schematic view of the wire-wound insulation member manufactured by the motor stator automatically assembling system and method in accordance with the preferred embodiment of the present invention.

FIG. 4 shows a schematic view of the wire-wound insulation member manufactured by the motor stator automatically assembling system and method, as best shown in FIGS. 1 and 2A, in accordance with the preferred embodiment of the present invention. Referring to FIGS. 1, 2A, 3 and 4, the motor stator automatically assembling method in accordance with the preferred embodiment of the present invention includes the step S4: automatically winding wires 102 on the wire-winding recesses of the associated insulation members 10 to form a plurality of wire-wound insulation members 10 with windings by the wire-winding unit 4. By way of example, a wire array seat 4a is provided with the wire-winding unit 4 to supply a plurality of the wires 102 thereto for wire-winding operation.

With continued reference to FIGS. 1, 2A, 3 and 4, by way of example, while or after automatically winding the wires 102 on the insulation members 10, the wires 102 are further automatically wound on the associated pin 101 to electrically connect therewith. Accordingly, the entire wire-winding process shall be simplified by reducing a separate wire-winding or binding process of the wire 102 with the pin 101.

Turning now to FIGS. 2A and 2B, by way of example, the wire-wound insulation members 10 are automatically extracted from the wire-winding unit 4, as best shown in FIG. 2A, are arranged in order on positioning seats of a second conveyer unit 3' (or rearranged on the first conveyer unit 3) and are further conveyed along the track to a first testing equipment 5 or a predetermined position (e.g. auto soldering unit) so as to process a procedure of solder-paste-wetting, soldering or pin-bending. The first testing equipment 5 is used to execute an impedance or insulation test on the wire-wound insulation members 10.

Referring again to FIGS. 1, 2B and 4, the motor stator automatically assembling method in accordance with the preferred embodiment of the present invention includes the step S5: automatically supplying and arranging the wire-wound insulation members 10 on a third conveyer unit (e.g. conveyer belt) 6 which is operated to convey the wire-wound insulation members 10 to a first assembly unit 6a and a second assembly unit 7. By way of example, the wire-wound insulation members 10 are automatically extracted from the first testing equipment 5 by a manipulator unit 5a and are further deployed on the third conveyer unit 6 by an air piston. The third conveyer unit 6 further includes a vibrator unit operated to convey the wire-wound insulation members 10.

Figure 5:
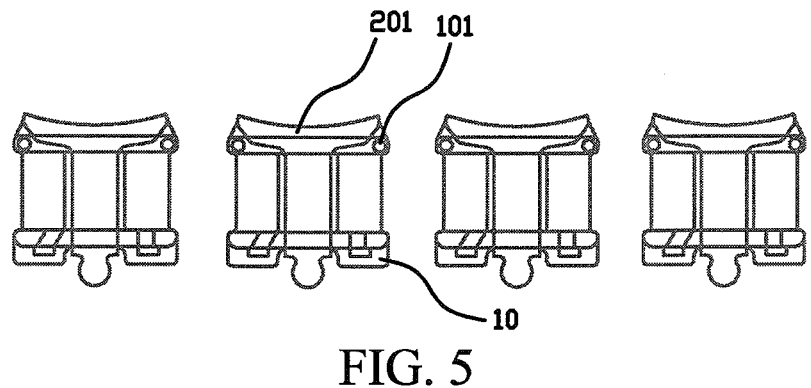
FIG. 5 is a schematic view of compact pole tooth sets assembled by the motor stator automatically assembling system and method in accordance with the preferred embodiment of the present invention.
Figure 5A:
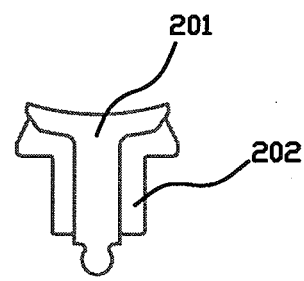
FIG. 5a is a schematic cross-sectional top view of a feed magazine and stacked pole teeth provided therein applied in the present invention.

FIGS. 5 and 5a are schematic views of compact pole tooth sets and stacked pole teeth provided in a feed magazine applied in the present invention. Referring to FIGS. 1, 2B, 5 and 5a, the motor stator automatically assembling method in accordance with the preferred embodiment of the present invention includes the step S6: automatically inserting a single pole tooth or stacked pole teeth 201 into the central holes of the wire-wound insulation members 10 in a manner of fitting to form a plurality of the compact pole tooth sets 10 by the first assembly unit 6a. Accordingly, after assembled, the compact pole tooth sets 10 are applied to generate magnetic fields to electrically drive a motor rotor, not shown in drawings. By way of example, each of the pole teeth 201 has a pole pillar, an engaging portion and a pole face, as best shown in FIG. 5a.

Referring again to FIGS. 1, 2B, 5 and 5a, by way of example, the first assembly unit 6a has eight or more sets of pole tooth storage units (e.g. feed magazine with magazine spring) 202 which are arranged in a circular member of the first assembly unit 6a. Each set has four pole tooth storage units 202 which are equi-spaced apart, as best shown in FIG. 2B. In assembling operation, the pole teeth 201 are fittingly inserted into the central holes of the wire-wound insulation members 10.

Figure 6:
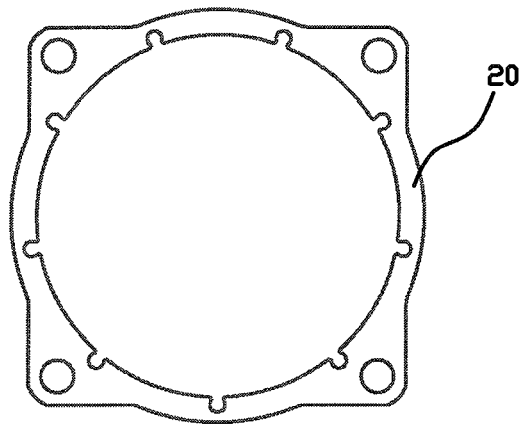
FIG. 6 is a schematic view of a stator ring frame applied in the present invention.
Figure 7:
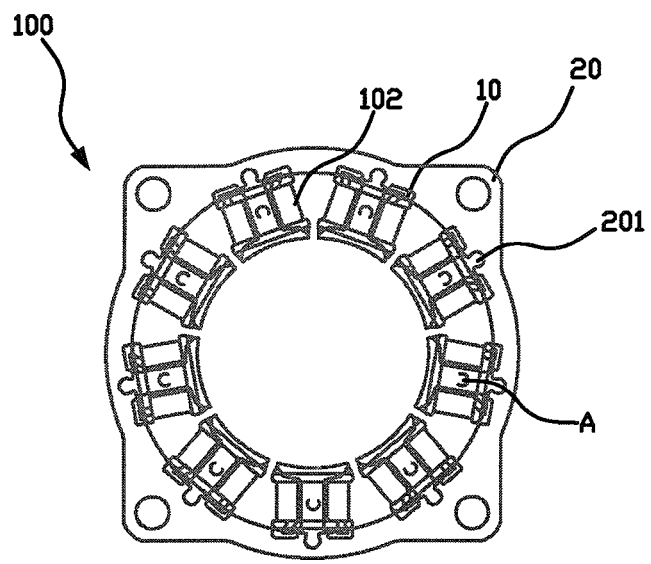
FIG. 7 is a schematic view of a semi-assembled motor stator assembled by the motor stator automatically assembling system and method in accordance with the preferred embodiment of the present invention.

FIG. 6 shows a schematic view of a stator ring frame applied in the present invention corresponding to stator ring frames 20 shown in FIG. 2B. FIG. 7 shows a schematic view of a semi-assembled motor stator formed by the stator ring frame, as best shown in FIG. 6, in accordance with the preferred embodiment of the present invention. Referring again to FIGS. 1, 2B, 6 and 7, the motor stator automatically assembling method in accordance with the preferred embodiment of the present invention includes the step S7: automatically inserting at least one or a plurality of the compact pole tooth sets 10 into the stator ring frame 20 to form a semi-assembled motor stator 100 by the second assembly unit 7. By way of example, the third conveyer unit 6 is provided to convey the compact pole tooth sets 10 to the second assembly unit 7 or is selectively omitted.

With continued reference to FIG. 6, by way of example, the stator ring frame 20 can be selected from an outer stator ring frame or an inner stator ring frame. Furthermore, the second assembly unit 7 includes a fourth conveyer unit 7a which is operated to convey the stator ring frame 20 to the second assembly unit 7 or may be omitted. The second assembly unit 7 includes a rotary server unit (e.g. 12-station rotary server unit) which is applied to rotate the stator ring frame 20 for inserting each of the compact pole tooth sets 10 into engaging portions of the stator ring frame 20.

Referring again to FIGS. 2B and 7, by way of example, the motor stator automatically assembling method in accordance with the alternative embodiment of the present invention further includes the step: automatically punching at least one surface of the semi-assembled motor stator 100 by a punch machine 8 to form a plurality of recessions "A" which are formed to combine the pole teeth 201 each other or to combine the compact pole tooth sets 10 with the stator ring frame 20 so as to reinforce the structure of the semi-assembled motor stator 100. The punch machine 8 further includes a rotary unit (e.g. manipulator) 8a which is applied to turn the semi-assembled motor stator 100 over for punching operation.

Figure 8:
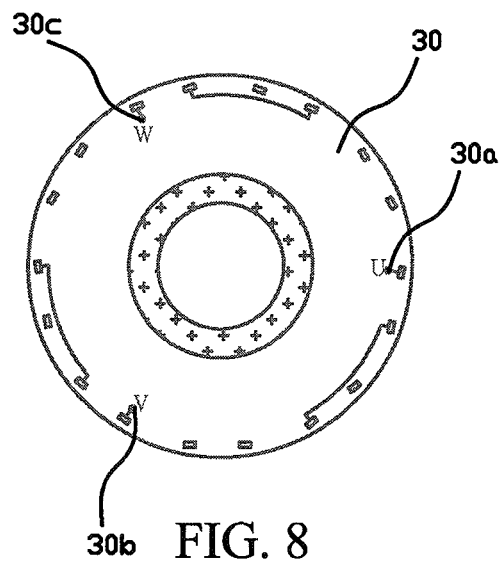
FIG. 8 is a schematic view of a printed circuit board applied in the present invention.
Figure 9:
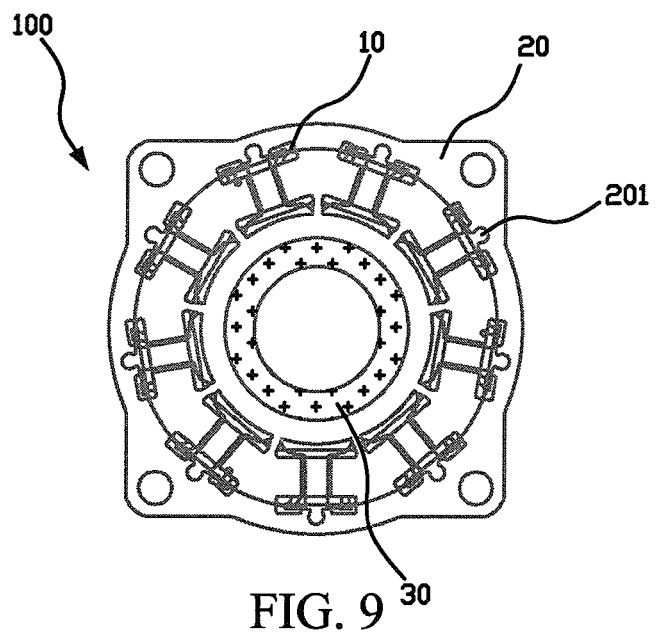
FIG. 9 is a schematic view of a complete-assembled motor stator manufactured by the motor stator automatically assembling system and method in accordance with the preferred embodiment of the present invention.

FIG. 8 shows a schematic view of a printed circuit board 30 attached to a side of the semi-assembled motor stator 100 shown in FIG. 7. FIG. 9 shows a schematic view of the printed circuit board 30, as best shown in FIG. 8, attached to a side of the semi-assembled motor stator 100, as best shown in FIG. 7, to form a complete-assembled motor stator in accordance with the preferred embodiment of the present invention. Referring again to FIGS. 1, 2B, 8 and 9, the motor stator automatically assembling method in accordance with the preferred embodiment of the present invention further includes the step S8: automatically combining the printed circuit board 30 with the semi-assembled motor stator 100 by an auto holder unit (e.g. manipulator) 9a to form a complete-assembled motor stator. In a preferred embodiment, the pins 101 of the semi-assembled motor stator 100, as best shown in FIG. 3, are inserted into via holes of the printed circuit board 30, and the pins are further bent and moistened with solder paste for soldering the semi-assembled motor stator 100 with the printed circuit board 30. By way of example, the printed circuit board 30 includes a plurality of contact points, including a first phase (U phase) contact point 30a, a second phase (V phase) contact point 30b and a third phase (W phase) contact point 30c. In order to improve the assembling operation, the contact points of U, V and W phases are provided with assembly marks shown at "U", "V" and "W" on the printed circuit board 30 for perfect alignment.

Referring again to FIGS. 1, 2B and 9, the motor stator automatically assembling method in accordance with the alternative embodiment of the present invention further includes the step: automatically executing a power test, a resistance test, a dielectric withstand voltage test, an insulation shock test or a load test on the complete-assembled motor stator 100 by a second test equipment 9b. Accordingly, the complete-assembled motor stators 100 are separated into two lines on which to convey qualified stator products and unqualified stator products.

Referring again to FIGS. 2A and 2B, the motor stator automatically assembling system in accordance with the preferred embodiment of the present invention selectively includes the pin insert unit 1, the feeder unit 2, the wire-winding unit 4, the first assembly unit 6a and the second assembly unit 7. In an alternative embodiment, the motor stator automatically assembling system further includes the vibrator unit 2a, the first conveyer unit 3, the second conveyer unit 3', the third conveyer unit 4, the fourth conveyer unit 7a, the punch unit 8, the rotary unit 8a, the first testing equipment 5, the second testing equipment 9b, the auto holder unit 9a or other equipments.

With continued reference to FIGS. 2A and 2B, the first conveyer unit 3 connects to the feeder unit 2 and the wire-winding unit 4 connects to the first conveyer unit 3. Furthermore, the second conveyer unit 3' connects to the wire-winding unit 4 and the first assembly unit 6a connects to the second conveyer unit 7 so as to form an assembly line.

Although the invention has been described in detail with reference to its presently preferred embodiment(s), it will be understood by one of ordinary skill in the art that various modifications can be made without departing from the spirit and the scope of the invention, as set forth in the appended claims.

What is claimed is:

1. A motor stator automatically assembling system comprising:

a feeder unit provided to feed a plurality of insulation members;

a first conveyer unit connecting to the feeder unit to receive the insulation members therefrom, the first conveyer unit operated to arrange the insulation members thereon and to convey the insulation members from the feeder unit;

a wire-winding unit connecting to the first conveyer unit to receive the insulation members therefrom, the wire-winding unit operated to wind wires on the insulation members to form a plurality of wire-wound insulation members;

a second conveyer unit connecting to the wire-winding unit to receive the wire-wound insulation members therefrom, the second conveyer unit operated to arrange the wire-wound insulation members thereon and to convey the wire-wound insulation members from the wire-winding unit;

a first assembly unit connecting to the second conveyer unit to receive the wire-wound insulation members therefrom, the first assembly unit operated to insert pole teeth into the wire-wound insulation members to form a plurality of compact pole tooth sets; and a second assembly unit operated to insert the compact pole tooth sets into a predetermined stator ring frame to form a semi-assembled motor stator.

2. The motor stator automatically assembling system as defined in claim 1, wherein the feeder unit further includes a vibrator unit which is operated to select the insulation members prior to feeding.

3. The motor stator automatically assembling system as defined in claim 1, further including a pin insert unit which is operated to insert at least one pin in the insulation member.

4. The motor stator automatically assembling system as defined in claim 3, wherein the pin insert unit is provided to insert the pin in the insulation member prior to selecting and feeding the insulation members.

5. The motor stator automatically assembling system as defined in claim 3, wherein, while winding the wires on the insulation members, the wires are further wound on the associated pin to electrically connect therewith.

6. The motor stator automatically assembling system as defined in claim 3, wherein the pins of the semi-assembled motor stator are inserted in a printed circuit board, thereby combining the semi-assembled motor stator with the printed circuit board to form a complete-assembled motor stator.

7. The motor stator automatically assembling system as defined in claim 6, wherein the pins are soldered with the printed circuit board to form a plurality of coils.

8. The motor stator automatically assembling system as defined in claim 1, further including a third conveyer unit connected between the first assembly unit and the second assembly unit, the third conveyer unit operated to convey the compact pole tooth sets to the second assembly unit.

9. The motor stator automatically assembling system as defined in claim 1, further including a fourth conveyer unit which is operated to convey the stator ring frame to the second assembly unit.

10. The motor stator automatically assembling system as defined in claim 1, wherein the pole teeth are provided in a feed magazine from which to insert the stacked pole teeth into the wire-wound insulation members.

11. The motor stator automatically assembling system as defined in claim 1, wherein a rotary unit is provided to rotate the stator ring frame with respect to the second assembly unit, thereby inserting each of the pole tooth sets into the stator ring frame.

12. The motor stator automatically assembling system as defined in claim 1, wherein at least one recession is formed on at least one surface of the semi-assembled motor stator to combine the pole teeth each other.

13. The motor stator automatically assembling system as defined in claim 1, wherein at least one recession is formed on at least one surface of the semi-assembled motor stator to combine the pole tooth sets with the stator ring frame so as to reinforce the structure of the semi-assembled motor stator.

14. The motor stator automatically assembling system as defined in claim 1, wherein a holder unit is provided to hold the printed circuit board in combining with the semi-assembled motor stator to form a complete-assembled motor stator.

15. The motor stator automatically assembling system as defined in claim 1, further including a first test equipment unit operated to execute an impedance or insulation test on the wire-wound insulation members.

16. The motor stator automatically assembling system as defined in claim 1, further including a second test equipment unit operated to execute a power test, a resistance test, a dielectric withstand voltage test, an insulation shock test or a load test on a complete-assembled motor stator.

* * * * *